United States Patent
Lee et al.

(10) Patent No.: US 11,138,167 B2
(45) Date of Patent: *Oct. 5, 2021

(54) OPTIMIZED IDENTIFICATION OF PERFORMANCE REGRESSION

(71) Applicant: SNOWFLAKE INC., San Mateo, CA (US)

(72) Inventors: Allison Lee, San Carlos, CA (US);
Shrainik Jain, Seattle, WA (US);
Qiuye Jin, Hillsborough, CA (US);
Stratis Viglas, Madison, WI (US);
Jiaqi Yan, San Carlos, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/943,274

(22) Filed: Jul. 30, 2020

(65) Prior Publication Data

US 2020/0356540 A1    Nov. 12, 2020

Related U.S. Application Data

(63) Continuation of application No. 16/692,927, filed on Nov. 22, 2019, now Pat. No. 10,762,067, which is a (Continued)

(51) Int. Cl.
*G06F 16/00* (2019.01)
*G06F 16/21* (2019.01)
(Continued)

(52) U.S. Cl.
CPC ........ *G06F 16/217* (2019.01); *G06F 11/0772* (2013.01); *G06F 11/3072* (2013.01);
(Continued)

(58) Field of Classification Search
None
See application file for complete search history.

(56) References Cited

U.S. PATENT DOCUMENTS

| 6,356,890 B1 | 3/2002 | Agrawal et al. |
| 2007/0006041 A1 | 1/2007 | Brunswig et al. |

(Continued)

OTHER PUBLICATIONS

Author: Michael Pradel, Markus Huggler, Thomas R. Gross; Title: "Performance Regression Testing of Concurrent Classes"; Date: Jul. 2017; Publisher: ACM; Pertinent Pages: whole document as attached.*

(Continued)

*Primary Examiner* — Anhtai V Tran
(74) *Attorney, Agent, or Firm* — Womble Bond Dickinson (US) LLP

(57) ABSTRACT

A baseline run of a workload and a target run of the workload are compared to identify whether there is a performance regression in the target run, wherein the target run implements a feature that is not implemented in the baseline run. In response to identifying the performance regression, the target run is executed to identify whether the performance regression still exists. The performance regression is flagged as a false positive in response to identifying that the performance regression no longer exists when the target run is executed.

30 Claims, 8 Drawing Sheets

Related U.S. Application Data continuation of application No. 16/359,452, filed on Mar. 20, 2019.

(60) Provisional application No. 62/646,817, filed on Mar. 22, 2018.

(51) Int. Cl.
    *G06F 11/34*     (2006.01)
    *G06F 11/07*     (2006.01)
    *G06F 16/215*    (2019.01)
    *G06F 11/30*     (2006.01)
    *G06F 16/2453*   (2019.01)

(52) U.S. Cl.
    CPC ...... *G06F 11/3428* (2013.01); *G06F 11/3452* (2013.01); *G06F 16/215* (2019.01); *G06F 16/24549* (2019.01)

(56) References Cited

U.S. PATENT DOCUMENTS

| | | | |
|---|---|---|---|
| 2008/0103790 A1* | 5/2008 | Abernethy | G06Q 30/018 705/317 |
| 2010/0082603 A1 | 4/2010 | Krompass et al. | |
| 2010/0131518 A1 | 5/2010 | Elteto et al. | |
| 2011/0314334 A1* | 12/2011 | Silver | G06F 11/3688 714/32 |
| 2014/0019965 A1 | 1/2014 | Neuse et al. | |
| 2015/0046141 A1* | 2/2015 | Lahiri | G06F 16/10 703/13 |
| 2016/0004621 A1 | 1/2016 | Gongloor et al. | |
| 2017/0039128 A1* | 2/2017 | Freschl | G06F 16/25 |
| 2017/0124487 A1* | 5/2017 | Szeto | G06N 20/00 |

OTHER PUBLICATIONS

Transmittal of International Preliminary Report on Patentability for PCT/US2019/023162, dated Oct. 1, 2020, pp. 11.

Transmittal of the International Search Report and Written Opinion of the International Searching Authority for PCT/US2019/023162, dated Jun. 11, 2019, pp. 12.

Nguyen, T.H.D. et al. (2012). "Automated Detection of Performance Regressions Using Statistical Process Control Techniques", ICPE, Boston Massachusetts, pp. 12.

Pradel, M. et al. (Jul. 21-25, 2014). "Performance Regression Testing of Concurrent Classes", ISSTA, pp. 13.

Jain, S. et al. (2018). "Query2Vec: An Evaluation of NLP Techniques for Generalized Workload Analytics", Proceedings of the VLDB Endowment, vol. 11, No. 5, pp. 14.

* cited by examiner

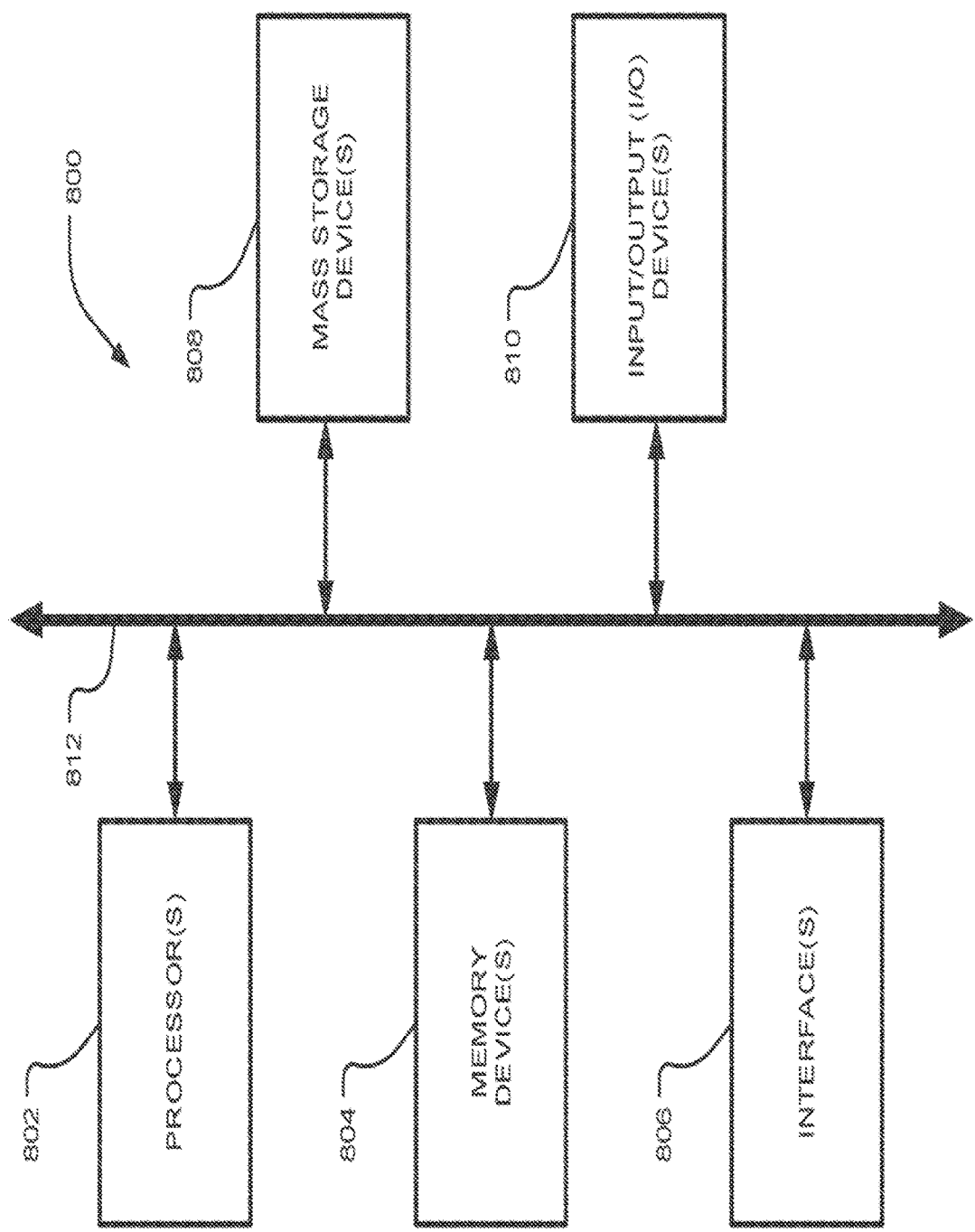

OPTIMIZED IDENTIFICATION OF PERFORMANCE REGRESSION

CROSS-REFERENCE TO RELATED APPLICATIONS

This application is a continuation of U.S. patent application Ser. No. 16/692,927, filed Nov. 22, 2019, titled "INCREMENTAL FEATURE DEVELOPMENT AND WORKLOAD CAPTURE IN DATABASE SYSTEMS", which is a continuation of U.S. patent application Ser. No. 16/359,452, filed Mar. 20, 2019, titled "INCREMENTAL FEATURE DEVELOPMENT AND WORKLOAD CAPTURE IN DATABASE SYSTEMS", which claims the benefit of U.S. Provisional Application Ser. No. 62/646,817, titled "SNOWTRAIL: TESTING WITH PRODUCTION QUERIES ON A CLOUD DATABASE," filed on Mar. 22, 2018, the disclosures of which are incorporated herein by reference in its entirety.

TECHNICAL FIELD

The present disclosure relates to databases and more particularly relates to feature development and workload capture in database systems.

BACKGROUND

This disclosure relates generally to systems, methods, and devices for feature implementation and workload capture in database systems. Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and require oversight by multiple persons having a wide range of technical skill sets.

Traditional relational database management systems (RDMS) require extensive computing and storage resources and have limited scalability. Large sums of data may be stored across multiple computing devices and a server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situation. Such traditional database systems come up with significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

There exist multiple architectures for traditional database systems and cloud databases systems. One example architecture is a shared-disk system. In the shared-disk system, all data is stored on a shared storage device that is accessible from all processing nodes in a data cluster. In this type of system, all data changes are written to the shared storage device to ensure that all processing nodes in the data cluster access a consistent version of the data. As the number of processing nodes increases in a shared-disk system, the shared storage device (and the communication links between the processing nodes and the shared storage device) becomes a bottleneck slowing data read and data write operation. This bottleneck is further aggravated with the addition of more processing nodes. Thus, existing shared-disk systems have limited scalability due to this bottleneck problem.

Another existing data storage and retrieval system is referred to as a "shared-nothing architecture." In this architecture, data is distributed across multiple processing nodes such that each node stores a subset of the data in the entire database. When a new processing node is added or removed, the shared-nothing architecture must rearrange data across the multiple processing nodes. This rearrangement of data can be time-consuming and disruptive to data read and write operations executed during the data rearrangement. And, the affinity of data to a particular node can create "hot spots" on the data cluster for popular data. Further, since each processing node performs also the storage function, this architecture requires at least one processing node to store data. Thus, the shared-nothing architecture fails to store data if all processing nodes are removed. Additionally, management of data in a shared-nothing architecture is complex due to the distribution of data across many different processing nodes.

Particularly in a database as a service (DBaaS) implementation where database management is provided in a cloud-based environment, it may be desirable to continually release new features or programs to database clients. These new programs may improve functionality of the database, may provide new features to database clients, may provide increased security, may provide faster runtimes, and so forth. However, there are always risks associated with releasing new programs that have not been rigorously tested in a real-world environment. In the case of database technology, there are inherent risks associated with releasing a new program that has not been tested on actual database data or with actual client queries on the database data. The program may have errors or bugs that could cause damage to the database data, cause issues with performance or runtime, perpetuate additional errors throughout other functionality in the database system, and so forth.

However, there are numerous challenges associated with testing a fast-moving cloud database service. For example, a largescale cloud-based database service will run tens of millions of client queries per day and may have an online upgrade process to ensure continuous availability. Features or programs may be released continuously, and clients may expect a fast turnaround for new functionality. This fast turnaround may mean there is a short time window for testing features or programs before release. Disclosed herein are improved systems, methods, and devices for testing features or programs and for capturing client workloads in database systems. The disclosures herein enable substantial improvements to the program development cycle so that new features or programs may be released to clients only after undergoing rigorous real-world testing.

BRIEF DESCRIPTION OF THE DRAWINGS

Non-limiting and non-exhaustive implementations of the present disclosure are described with reference to the following figures. Advantages of the present disclosure will become better understood with regard to the following description and accompanying drawings where:

FIG. 8 is an example computing device in accordance with the teachings and principles of the disclosure.

DETAILED DESCRIPTION

Figure 1:
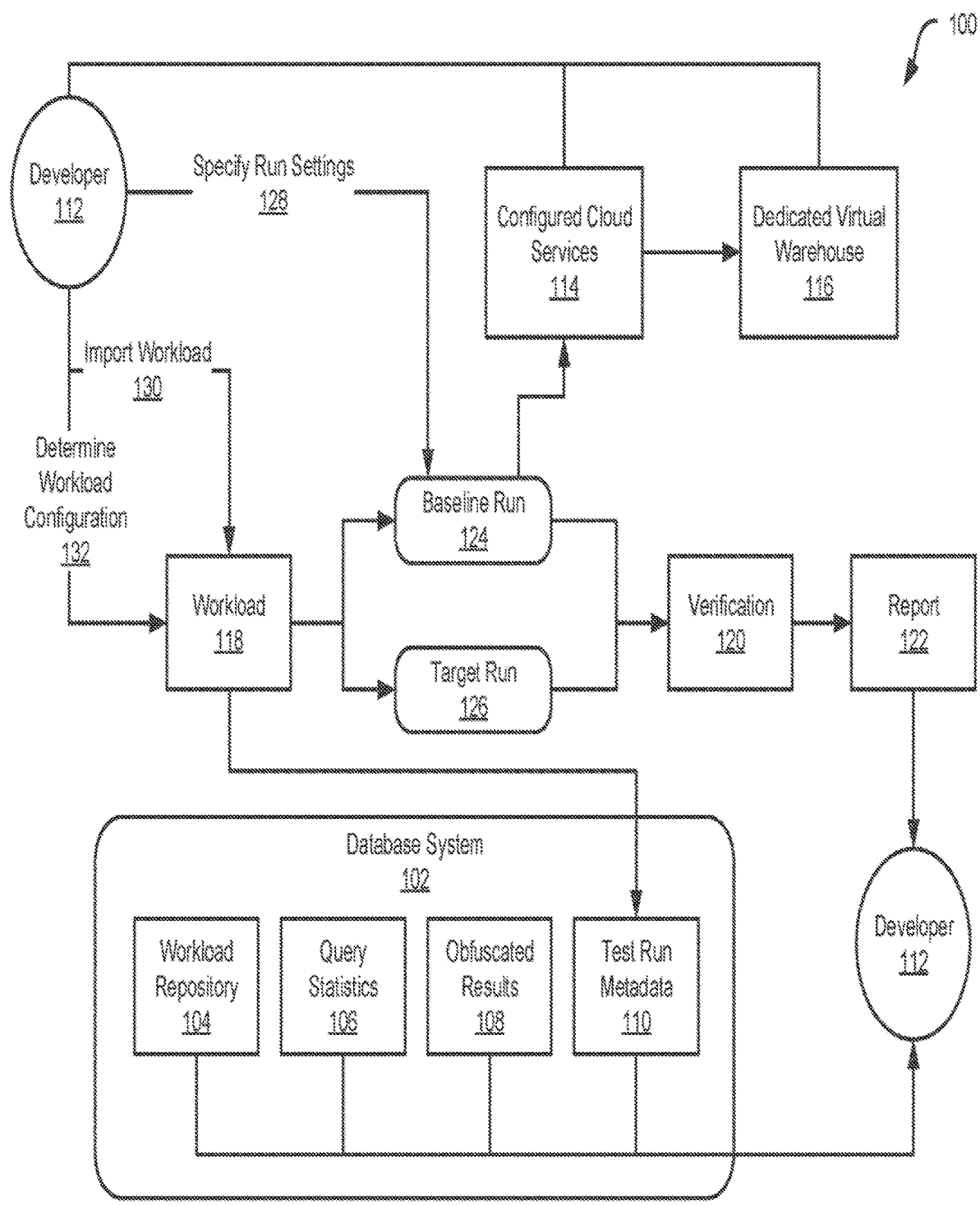
FIG. 1 is a schematic diagram of a process flow for testing a feature, in accordance with the teachings and principles of the disclosure.

The disclosure extends to systems, methods, and devices for incremental feature development and workload capture in database systems. Implementations of the disclosure may be implemented in a cloud-based database design and may be referred to as a database as a service (DBaaS) architecture. The service-oriented architecture of a cloud-based database system offers opportunities for generating new functionality and new programs. In some instances, it can be imperative that new features and/or programs are rigorously tested before being released to a client or operated on a client's database data. Program testing can reveal errors or bugs that could damage database data, increase runtimes, or cause other issues with performance. In some instances, it may be beneficial to test features or programs on actual database data or with actual database queries before the features or programs are released to production servers. Disclosed herein are systems, methods, and devices for capturing client workloads in a database system to test features or programs on a client's actual database data and/or with a client's actual database queries. Such systems, methods, and devices provide improved testing of database features or programs to enable developers to fix errors or bugs before programs are released to production servers. Testing with client production queries may provide exact knowledge of the impact of a program on a client's queries and therefore permit feedback to be gathered and improvements to be made to the program before the program is released to any clients.

In an embodiment, a method is implemented for testing a feature on a database. The method includes determining a workload comprising one or more historical client queries to be rerun for testing the feature, wherein the feature comprises procedural logic. The method includes executing a baseline run of the workload that does not implement the feature. The method includes executing a target run of the workload while implementing the feature. The method includes comparing the baseline run and the target run to identify whether there is a performance regression in the target run. The method includes, in response to identifying the performance regression, rerunning the target run under isolated resource constraints to identify whether the performance regression still exists.

The improved testing and incremental feature development as disclosed herein may be implemented by harvesting historical data stored in a data warehouse. The historical data may include a history of all client-issued queries along with configurations and related statistics for those queries. The historical data may further include actual database data and metadata that was used to execute those client-issued queries. The multi-tenant cloud-based database architecture as disclosed herein enables the historical data to be stored securely and accessed securely by a resource manager or global services. The historical data may be leveraged to enable work-load analytics and incremental development of new features or programs. The systems, methods, and devices disclosed herein create the unique capability to run actual historical client queries to test features or programs that may be provided by the database itself.

In an embodiment, a developer of a program or feature may rerun actual client queries to test the program in a real-world scenario using actual database data. In some instances, because actual client queries are being leveraged for testing purposes, it can be imperative to ensure that the client queries are obfuscated and cannot be read by the developer during the testing process. As disclosed herein, the client queries may be rerun on an isolated cloud service using separate, dedicated virtual warehouses 116 to ensure the client's security is maintained.

In an embodiment, the systems and methods for testing a feature or other procedural logic may be implemented without impacting any processing or execution resources that are allocated for client tasks. In an embodiment, a multiple tenant cloud-based database system is deployed. The database system may service database storage and processing for multiple database clients. The database clients may store database data across a plurality of shared storage devices and may utilize one or more execution platforms having multiple execution nodes. The database system may be organized such that storage and computing resources are effectively infinitely scalable. The systems and methods for testing a feature, such as procedural logic to improve or alter database functions, may be deployed without impacting or slowing any client functions. Client functions may include queries received directly from a client and/or may include "internal" tasks such as re-clustering a table, generating or updating a materialized view, updating metadata, and so forth. In an embodiment, feature testing systems and methods are deployed on execution/processing resources that are separate from any resources used for executing internal or external client tasks.

There are numerous challenges associated with testing programs in a fast-moving cloud database service. For example, a largescale database provider may run tens of millions of client queries per day and have an online upgrade process to ensure continuous availability. A database provider may adopt a continuous release cycle for new features or programs that enables fast feature delivery but causes a relatively short time window for testing on the release artifacts. For example, a database provider may release new features at a certain time every week. When a first feature is released on a first week, the feature can be tested in real-world use for only one week before a second feature is released on a second week. The release of the second feature disrupts any valuable testing of the first feature. Therefore, for fast release cycles, it is desirable to test programs using actual client queries before the program is released or is migrated to actual client workloads. Such testing provides assurance of the stability and success of the program.

However, in some implementations involving a largescale database provider, it is prohibitively expensive to rerun all client queries submitted to the database provider. Particularly in a fast release cycle, it may be cost prohibitive to rerun client queries before a new program is released. Therefore, one aspect of the disclosures herein include workload sampling and selection to ensure that testing consumes a reasonable amount of time and resources while still providing reliable results.

The systems, methods, and devices for incremental feature development and workload capture may be implemented with cloud-based database technology. Database data may be stored in cloud based storage that is accessible across geographic regions. This cloud-based storage refers to database data that is stored at an off-site storage system that may be maintained by a third party in some implementations. For example, a client may elect to store data with a cloud storage provider rather than storing the data on a local computer hard drive or other local storage device owned by the client. The client may access the data by way of an Internet connection between the client's computing resources and the off-site storage resources that are storing the client's data.

Cloud storage of database data may provide several advantages over traditional on-site local storage. When the database data is stored in cloud storage, the information may be accessed at any location that has an Internet connection. Therefore, a database client is not required to move physical storage devices or use the same computer to save, update, or retrieve database information. Further, the database information may be accessed, updated, and saved by multiple users at different geographic locations at the same time. The client may send copies of files over the Internet to a data server associated with the cloud storage provider, which records the files. The client may retrieve data by accessing the data server associated with the cloud storage provider by way of a Web-based interface or other user interface. The data server associated with the cloud storage provider may then send files back to the client or allow the client to access and manipulate the files on the data server itself.

A database table may be altered in response to a data manipulation (DML) statement such as an insert command, a delete command, a merge command, and so forth. Such modifications may be referred to as a transaction that occurred on the database table (the modification may alternatively be referred to herein as an "update"). In an embodiment, each transaction includes a timestamp indicating when the transaction was received and/or when the transaction was fully executed. In an embodiment, a transaction includes multiple alterations made to a table, and such alterations may impact one or more micro-partitions in the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

In one embodiment, metadata may be stored in metadata micro-partitions in immutable storage. In one embodiment, a system may write metadata micro-partitions to cloud storage for every modification of a database table. In one embodiment, a system may download and read metadata micro-partitions to compute the scan set. The metadata micro-partitions may be downloaded in parallel and read as they are received to improve scan set computation. In one embodiment, a system may periodically consolidate metadata micro-partitions in the background. In one embodiment, performance improvements, including pre-fetching, caching, columnar layout and the like may be included. Furthermore, security improvements, including encryption and integrity checking, are also possible with metadata files with a columnar layout.

In the following description of the disclosure, reference is made to the accompanying drawings, which form a part hereof, and in which is shown by way of illustration specific implementations in which the disclosure may be practices. It is understood that other implementation may be utilized, and structural changes may be made without departing from the scope of the disclosure.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

Reference throughout this specification to "one embodiment," "an embodiment," "one implementation," "an implementation," "one example," or "an example" means that a particular feature, structure, or characteristic described in connection with the embodiment, implementation, or example is included in at least one embodiment of the present disclosure. Thus, appearances of the above-identified phrases in various places throughout this specification are not necessarily all referring to the same embodiment, implementation, or example. In addition, it should be appreciated that the figures provided herewith are for explanation purposes to persons ordinarily skilled in the art.

As used herein, the terms "comprising," "including," "containing," and grammatical equivalents thereof are inclusive or open-ended terms that do not exclude additional, unrecited elements or method steps.

As used herein, "table" is defined as a collection of records (rows). Each record contains a collection of values of table attributes (columns). Tables are typically physically stored in multiple smaller (varying size or fixed size) storage units, e.g., files or blocks.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein may operate on a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database, and any type of data storage and retrieval platform, using any data storage architecture and using any language to store and retrieve data within the data storage and retrieval platform. The systems and methods described herein further provide a multi-tenant system that supports isolation of computing resources and data between different customers/clients and between different users within the same customer/client.

Referring now to the figures, FIG. 1 is a schematic diagram of a process flow 100 for feature testing in a database system. The process flow 100 provides a tool for running production queries and detecting regressions. The process flow 100 may organize queries into workloads that may be run under different settings and later compared to analyze differences between the runs. The workloads may consist of actual historical client queries that were requested by a client and executed for the client on actual database data. The process flow 100 provides multiple functionalities, including: workload selection, workload running, and results analysis. Workload selection includes sampling appropriate workload from a repository of historical client queries for the purpose of a current test. Workload running includes running the selected workload with specified settings. Results analysis includes consuming results of multiple runs and compares those results to generate a report on differences or regressions. Useful data determined as a result of the process flow 100 may be stored as database data in one or more tables.

The process flow 100 illustrated in FIG. 1 may represent a process flow for feature testing. The process flow 100 may be implemented by a developer 112 of a feature or program that is intended to be implemented on the database system 102. The database system 102 includes a workload repository 104, query statistics 106, obfuscated results 108, and test run metadata 110. The developer 112 may build a workload 118 of queries to run by specifying the workload selection configuration at 132 or directly importing a workload at 130. The workload selection configuration at 132 includes criteria for selecting queries best suited for testing a target feature. A workload 118 is then generated based on the given configurations set by the developer 112.

After the workload 118 is generated, the developer 112 specifies run settings at 128. The run settings are used for running the workload 118. In an embodiment, at least two sets of run settings are needed where one set is a baseline run 124 and one set is a target run 126. For feature testing, the two settings (i.e., the baseline run 124 and the target run 126) may be the same except for a feature flag. A feature testing run may be decoupled from the workload 118 so the workload 118 may be run any number of times with different settings.

The developer 112 initiates the baseline run 124 and the target run 126 on dedicated virtual warehouses 116 to ensure resource isolation. When the baseline run 124 and/or the target run 126 are finished, a verification of the results is performed at 120 to eliminate false positives. The verification at 120 is run by the report 122 is generated for regressions. A false positive may most typically occur in performance comparisons and may be caused by variations in the cloud database environment. All relevant data including query history, query statistics 106, obfuscated results 108, and metadata of the runs are stored in the database system 102. The relevant data may be available to be queried using Structured Query Language (SQL). The developer 112 may drill down to investigate specific queries from the report 122 or choose to perform deeper analysis using customized SQL queries depending on the goal of a test.

Workloads

The workload 118 may be automatically selected based on a set of criteria provided by the developer 112 given the number of queries (i.e., sample size) in the workload 118. A wide variety of selection criteria may be used to determine the workload 118. The selection criteria may include accounts and users that issues historical queries, database and schema of the historical queries, the time window the historical queries were run on, matching query text fragments, matching execution configurations, and so forth.

After deduplicating the historical queries that satisfy the developer-supplied criteria, a set of heuristics may be applied that further prunes the search space. A sizeable percentage of historical queries in the system may be very simple or may not present significant testing value. For example, "select1" queries are frequently issued by some tools to verify whether there is a valid connection to the database. Such historical queries do not provide significant testing value. Further, historical queries selected for testing may be optimized to ensure they consume a reasonable amount of resources. Therefore, historical queries selected for testing should be optimized such that the selected historical queries are not too simple to provide valuable information and are not too expensive. For remaining historical queries that are not pruned for being too simple or too expensive, a subset of historical queries is selected that may achieve maximum coverage according to a diversity measurement. Many production schemas may have fixed usage patterns. In some implementations, it may be enough to select a small number of representative queries for each query pattern.

In an embodiment, a diverse workload 118 is selected using a Query2Vec algorithm. The Query2Vec algorithm maps historical SQL queries to a high dimensional vector space. Therefore, historical queries can be embedded into a high-dimensional vector space in a manner that preserves semantics such that cosine distance between the vectors performs as well as application-specific distance functions over application-specific feature vectors. Further in an embodiment, to summarize a workload 118, all historical queries are embedded using the Query2Vec algorithm and then K query clusters are found using K-means. The historical query that is closest to the centroid in each cluster may be selected as a representative query for that cluster in the summary. The optimal K value may be determined using the Elbow method by running the K-means algorithm in a loop with increasing K until the rate of change of the sum of squared distances from centroids "elbows" plateaus out. This method may ensure that the subsample created includes at least one query from all query clusters, where a specific type of client query is represented in each query cluster.

The selected workload is persisted in the workload repository 104 in the database system 102. The workload repository 104 stores past selected workloads along with some associated contexts such as the compilation environment and the start time of the original query. These associated contexts may be useful for rerunning the queries. The workload repository 104 may store previously selected workloads such that the workloads may be rerun to pick up a latest set of client queries that satisfy the selection criteria. Selected workloads may be imported directly from query texts or other structure formats like comma-separated values (CSV) or JavaScript Objection Notation (JSON). This may typically be used when the previously selected workload is fixed, and the developer 112 has an exact knowledge of which historical queries to run. The selected queries may include not only production queries, but any query the developer 112 wishes to test on a production environment.

Historical Query Runs

Several mechanisms may be employed to enable running client queries in a secure, reliable, and configurable way. Such mechanisms include, for example, result obfuscation, query redirection, configurable query compilation environment, and time travel.

Result obfuscation may be used in instances where data security is important. In certain instances, and for certain database data or database clients, it can be imperative to ensure that database data and query results are secure. Result obfuscation may be implemented to ensure that rerunning a client query does not reveal the client's data. During the compilation phase, hash aggregation operators may be added to the top of a query plan. These hash aggregation operators reduce the results of obfuscated queries to one single hash value and guarantee that the developer 112 will not be able to see the results returned by the rerun historical client query. The hash function may compute a stable hash aggregation that ensures the results are comparable for different runs of the same historical client query. The stable hash aggregation may ensure that the developer 112 has visibility only into whether the rerun query result is the same as the original query result, and that the developer 112 does not have any visibility into the actual values of the query result.

Query redirection enables the comparison of two or more versions of cloud services and virtual warehouses. A query redirection mechanism may be implemented to redirect queries to run on a specified cloud services instance with the test version. Query redirection includes specifying a set of cloud service resources to run a query on, such as a set of execution platforms and/or specific execution nodes within the set of execution platforms. Query redirection may be used to achieve isolation as well as testing on a particular version of programming logic or code. For example, one way to run a test of programming logic is to provision dedicated cloud instances with a particular package version and to redirect test queries to run on the provisioned instances.

For workloads imported as query texts, a configurable query compilation environment (e.g., account, database, and schema) may be specified to successfully run the workload. Other environment settings such as feature flags] may also be configured. A feature flag includes a parameter (i.e. knob) for controlling and/or enabling a feature. A configuration query compilation environment includes a means to execute a query from an internal account that is controlled by a database manager or provider. The configurable query compilation environment may be implemented to take advantage of multi-tenancy capabilities in a multi-tenant cloud-based database system. In a configurable query compilation environment, during a name resolution phase of compilation, a special role may be allowed to pick up a "namespace" of a database customer query and resolve related objects.

In an embodiment, historical query testing is configured to run with a time travel timestamp such that all historical queries in the workload will be run as of the specified timestamp of the original run of the historical query. Query results of two runs may be comparable only when they have the same time travel version because the database data may be updated by way of Data Manipulation Language (DML) statements concurrently during a historical query testing run.

In an embodiment, a feature or program is run against an historical client query. A run of an historical client query aims to test the client query without impacting the client's production workload. Therefore, in an embodiment, a run of an historical client query (i.e., a test run) is conducted on separate configured cloud services 114 and separate dedicated virtual warehouses 116. The configured cloud services 114 and the dedicated virtual warehouses 116 may be configured by the developer 112. Depending on the resources available (e.g., the size of the dedicated virtual warehouse 116), the developer 112 may specify the concurrency to use to run the workload 118. High concurrency runs may also be used as a good stress testing mechanism for the dedicated virtual warehouse 116. The systems disclosed herein may further implement a timeout limit to place a cap on a maximum time an historical query can run before it is canceled. This may avoid rogue queries from taking up too many resources.

In an embodiment, the systems disclosed herein maintain the original start time of an historical client query. In an embodiment, the systems provide a "replay" mode to run the workload 118. The replay mode runs the historical queries with the same time intervals apart as the original start times. This may be useful for simulating the exact impact of a captured client workload on the system. Further, the systems disclosed herein may provide an "explain" mode that compiles queries in the workload 118 for detecting plan changes and compilation errors.

Verification and Analysis

After the workload 118 generates multiple runs under different settings (e.g., the baseline run 124 and the target run 126), the feature testing system may perform verification at 120 and analysis on the results to generate a report 122. The verification steps at 120 may be beneficial for performance comparison to reduce false positive rates. When comparing the baseline run 124 and the target run 126, the feature testing system verifies at 120 performance regressions in the target run 126 by rerunning the queries reported as slower than the same queries in the baseline run 124 multiple times using the target run 126 settings. This may be beneficial in weeding out false positives in performance comparisons due to variations in the cloud environment or different cache states for either the data in virtual warehouses or the metadata in the cloud services layer. Only after a query consistently shows a significant percentage of performance regression after several verification runs does the feature testing system report feature or program as an actual performance issues. Further, data changes to the underlying tables may make performance comparisons irrelevant to the client's use case, e.g., for a staging table that is loaded with data, processed, and then truncated.

In addition to detecting performance regressions, the feature testing system further detects wrong results as well as new user errors or internal errors. The feature testing system automatically generates a report 122. The feature testing system ensures that the report 122 ensures that comparisons are always valid. For example, non-deterministic queries are excluded from performance and result comparisons. Queries that reached a timeout limit set by the runs are not compared for performance differences. Queries that fail with the same error code in both runs (i.e., the baseline run 124 and the target run 126) are not reported as regressions.

In an embodiment, it may be beneficial to ensure the report 122 is concise and easy for a developer 112 to digest. Because all metadata of the workloads and runs are stored in the feature testing system, including detailed statistics for each query, sophisticated users may easily write their own analytical queries to perform more detailed analysis suited to their own testing requirements.

Figure 2:
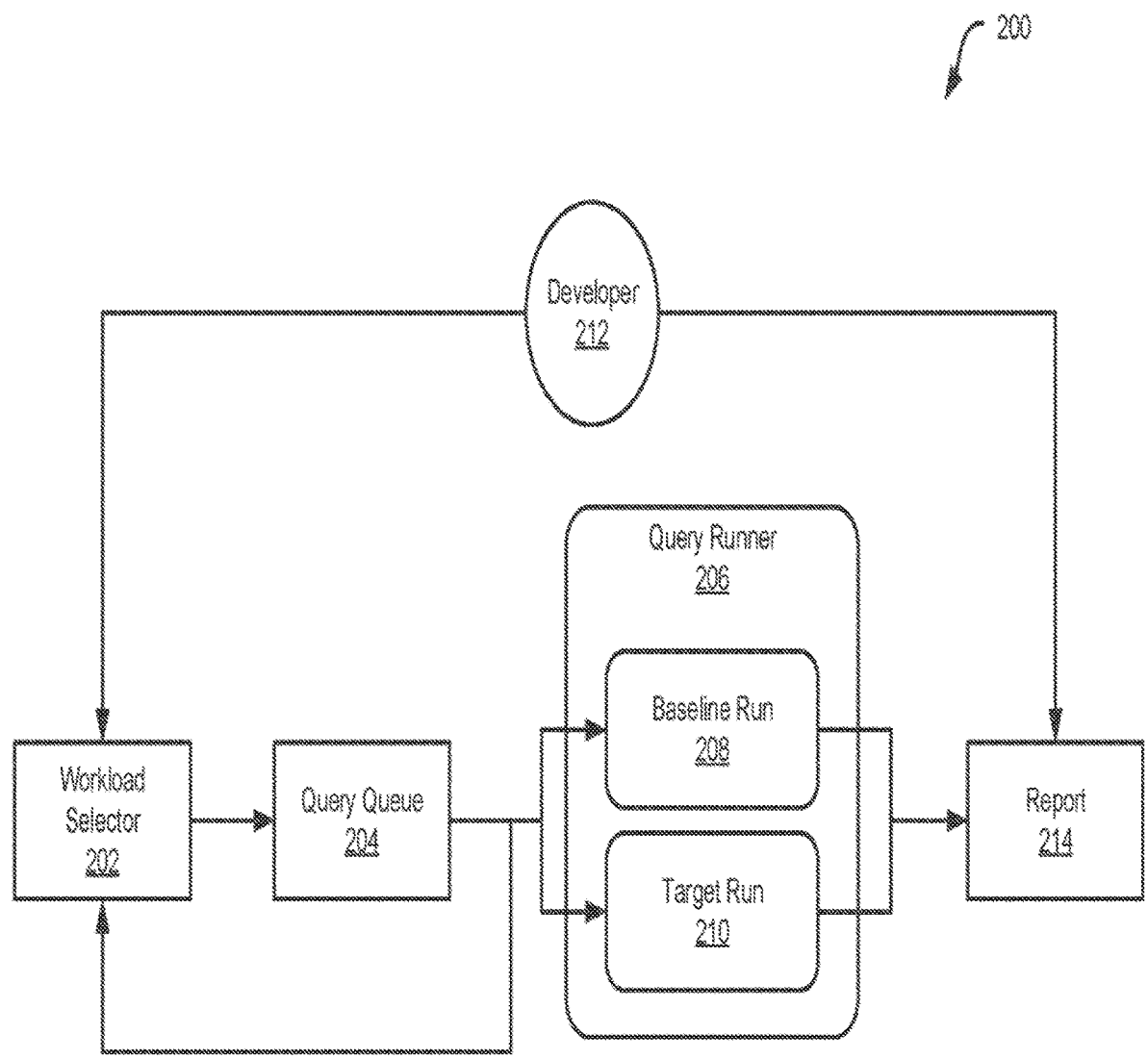
FIG. 2 is a schematic diagram of a process flow for testing a feature by way of a streaming implementation, in accordance with the teachings and principles of the disclosure.

Referring now to FIG. 2, a process flow 200 for a feature testing system streaming run is shown. In an embodiment, the default mode for the feature testing system is batch-oriented where a workload 118 is selected up front and then run under different settings for comparison. This batch-oriented mode may work well for small to medium sized workloads 118 but may not work well for larger workloads. Larger workloads pose several problems. One problem posed by larger workloads is that they take longer to run, and over time, many of the original historical queries will no longer be valid due to schema changes such as dropped tables. An additional problem is that, even in the absence of a schema change, clients are constantly ingesting new data into the database. To enable results comparisons, the feature testing system uses a fixed time travel version for each run which is typically set at the beginning of the run. An additional problem is that, because the workload 118 is fixed up front, opportunities are missed to select the latest set of queries to satisfy the search criteria.

The process flow 200 for the streaming mode addresses the aforementioned problems with the batch-oriented process flow 100 illustrated in FIG. 1. In the streaming mode process flow 200, the developer 212 provides workload configuration and run settings similar to the ones provided in the batch mode (see 100). However, instead of selecting all queries in the workload up front, the developer 212 now controls the streaming speed which specifies how many queries to select for each unit time period.

In the streaming mode, workloads are selected incrementally by the workload selector 202 in micro-batches and added to a query queue 204 which then submits queries to the query runner 206. The query runner 206 takes in each query and multiplexes it to run with different settings before performing verification and comparison to generate the report 214. The query runner 206 will run the baseline run 208 and the target run 210 according to different parameters that may be determined by the query runner 206 or input by the developer 212. The results of the streaming runs may be periodically flushed to shared storage devices in the database system so that users may poll the latest results from an ongoing streaming run.

Because queries are submitted to the query runner 206 individually, the queries may be run using different time travel versions. In the streaming mode process flow 200, each query uses the current timestamp they submitted to the query runner 206 as the time travel version and there is no need to travel far back in time. Additionally, because workloads are selected incrementally, the workloads are guaranteed to only contain very recent historical queries. This means there are fewer data changes or schema changes when running these historical queries compared with the batch-oriented mode illustrated in FIG. 1. This results in fewer invalid queries. With the streaming mode process flow 200, the feature testing system may support longer runs with higher success rates when compared with the batch-oriented mode.

The streaming mode process flow 200 may be used for feature release testing to pick up latest client queries and improve the success rate of those queries. The runs may be used to ensure the stability of a feature or program before the feature or program is migrated to client workloads.

In certain instances, it may be desirable to minimize the time window between when new release artifacts are available and when migration begins of clients to a newly released feature or program. In order to achieve this, the release run may use high concurrency and run queries on a dedicated multi-cluster warehouse which can automatically scale up and down to handle query workloads.

The workload selector 202 ensures that the sample of chosen historical queries covers a diverse set of use cases. The sample selected using Query2Vec may cause the query selection to be spread out and diverse because the Query2Vec algorithm guarantees picking one query sample from each query cluster, and thus ensures coverage of all types of queries.

Feature Testing

Before a new feature or program, such as a SQL-related improvement, is released to database clients, the new feature or program is tested on production queries using the feature testing system. The new feature or program is tested to gain insights on the impacts of the change (i.e., the implementation of the new feature or program) to database clients. To test new features and programs, a developer may set up feature flags and follow the process flow 100, 200 as described in FIGS. 1-2.

Figure 3:
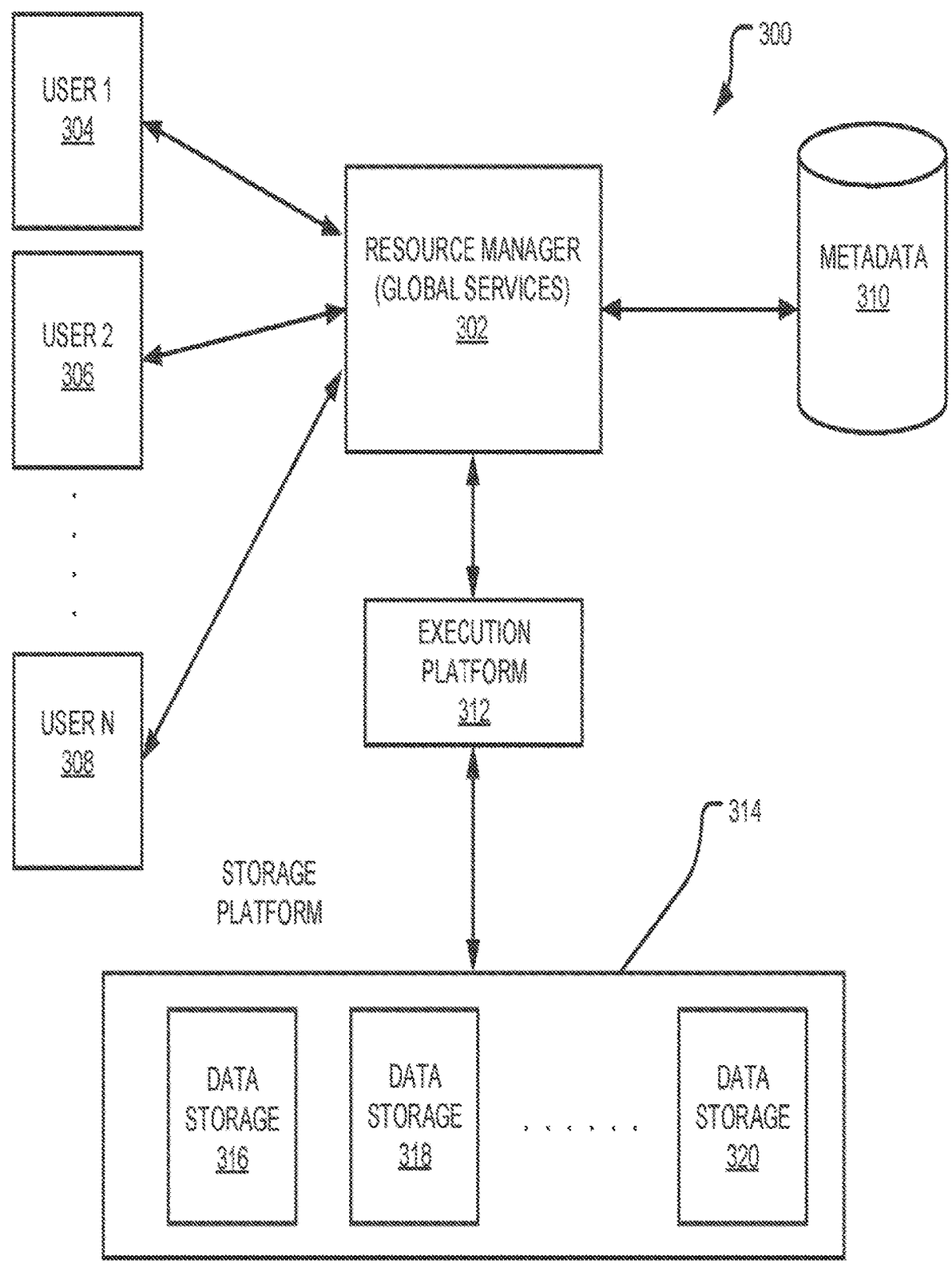
FIG. 3 is a block diagram of components of a retrieval and data storage system in accordance with the teachings and principles of the disclosure.

Referring now to FIG. 3, a computer system 300 is illustrated for running the methods disclosed herein. The computer system 300 may be configured for testing features or programs during a development phase by executing those features or programs on actual database data. The computer system 300 may be used for executing real client queries received from users and/or for rerunning those real client queries at a later time for the purpose of feature testing.

As shown in FIG. 3, resource manager 302 may be coupled to multiple users 304, 306, and 308. In particular implementations, resource manager 302 can support any number of users desiring access to data processing platform 300. Users 304, 306, 308 may include, for example, end users providing data storage and retrieval requests, system administrators managing the systems and methods described herein, and other components/devices that interact with resource manager 302. The users 304, 306, and 308 may be referred to herein as "clients" and may have a direct connection to one or more deployments as disclosed herein. Each of the users 304, 306, and 308 may be connected to a primary deployment and have the capability to transition the connection from the primary deployment to a secondary deployment.

Resource manager 302 provides various services and functions that support the operation of all systems and components within data processing platform 300. Resource manager 302 may be coupled to metadata 310, which is associated with the entirety of data stored throughout data processing platform 300. In some embodiments, metadata 310 may include a summary of data stored in remote data storage systems as well as data available from a local cache. Additionally, metadata 310 may include information regarding how data is organized in the remote data storage systems and the local caches. Metadata 310 may allow systems and services to determine whether a piece of data needs to be processed without loading or accessing the actual data from a storage device.

Resource manager 302 may be further coupled to the execution platform 312, which provides multiple computing resources that execute various data storage and data retrieval tasks, as discussed in greater detail below. In an embodiment, there exists one or more execution platforms 312 used for executing client tasks, such as database queries and/or "internal" database tasks such as updating metadata, clustering a table, generating a materialized view, and so forth. In such an embodiment, there may also exist one or more execution platforms 312 used for incremental feature development and/or testing, and those execution platforms 312 are separate from the client execution platforms 312 such that client processing is not impacted by feature development tasks. Execution platform 312 may be coupled to multiple data storage devices 316, 318, and 320 that are part of a storage platform 314. Although three data storage devices 316, 318, and 320 are shown in FIG. 3, execution platform 312 is capable of communicating with any number of data storage devices. In some embodiments, data storage devices 316, 318, and 320 are cloud-based storage devices located in one or more geographic locations. For example, data storage devices 316, 318, and 320 may be part of a public cloud infrastructure or a private cloud infrastructure. Data storage devices 316, 318, and 320 may be hard disk drives (HDDs), solid state drives (SSDs), storage clusters or any other data storage technology. Additionally, storage platform 314 may include distributed file systems (such as Hadoop Distributed File Systems (HDFS)), object storage systems, and the like.

In particular embodiments, the communication links between resource manager 302 and users 304, 306, and 308, metadata 310, and execution platform 312 are implemented via one or more data communication networks. Similarly, the communication links between execution platform 312 and data storage devices 316, 318, and 320 in storage platform 314 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 3, data storage devices 316, 318, and 320 are decoupled from the computing resources associated with execution platform 312. In an embodiment, each of a plurality of database deployments may include storage platform 314 having multiple data storage devices 316, 318, and 320. Each of the storage platforms 314 across the multiple deployments may store a replica of the database data such that each of the multiple deployments is capable of serving as a primary deployment where updates and queries are executed on the database data. This architecture supports dynamic changes to data processing platform 300 based on the changing data storage/retrieval needs as well as the changing needs of the users and systems accessing data processing platform 300. The support of dynamic changes allows data processing platform 300 to scale quickly in response to changing demands on the systems and components within data processing platform 300. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Resource manager 302, metadata 310, execution platform 312, and storage platform 314 are shown in FIG. 3 as individual components. However, each of resource manager 302, metadata 310, execution platform 312, and storage platform 314 may be implemented as a distributed system (e.g., distributed across multiple systems/platforms at multiple geographic locations). Additionally, each of resource manager 302, metadata 310, execution platform 312, and storage platform 314 can be scaled up or down (independently of one another) depending on changes to the requests received from users 304, 306, and 308 and the changing needs of data processing platform 300. Thus, data processing platform 300 is dynamic and supports regular changes to meet the current data processing needs.

Figure 4:
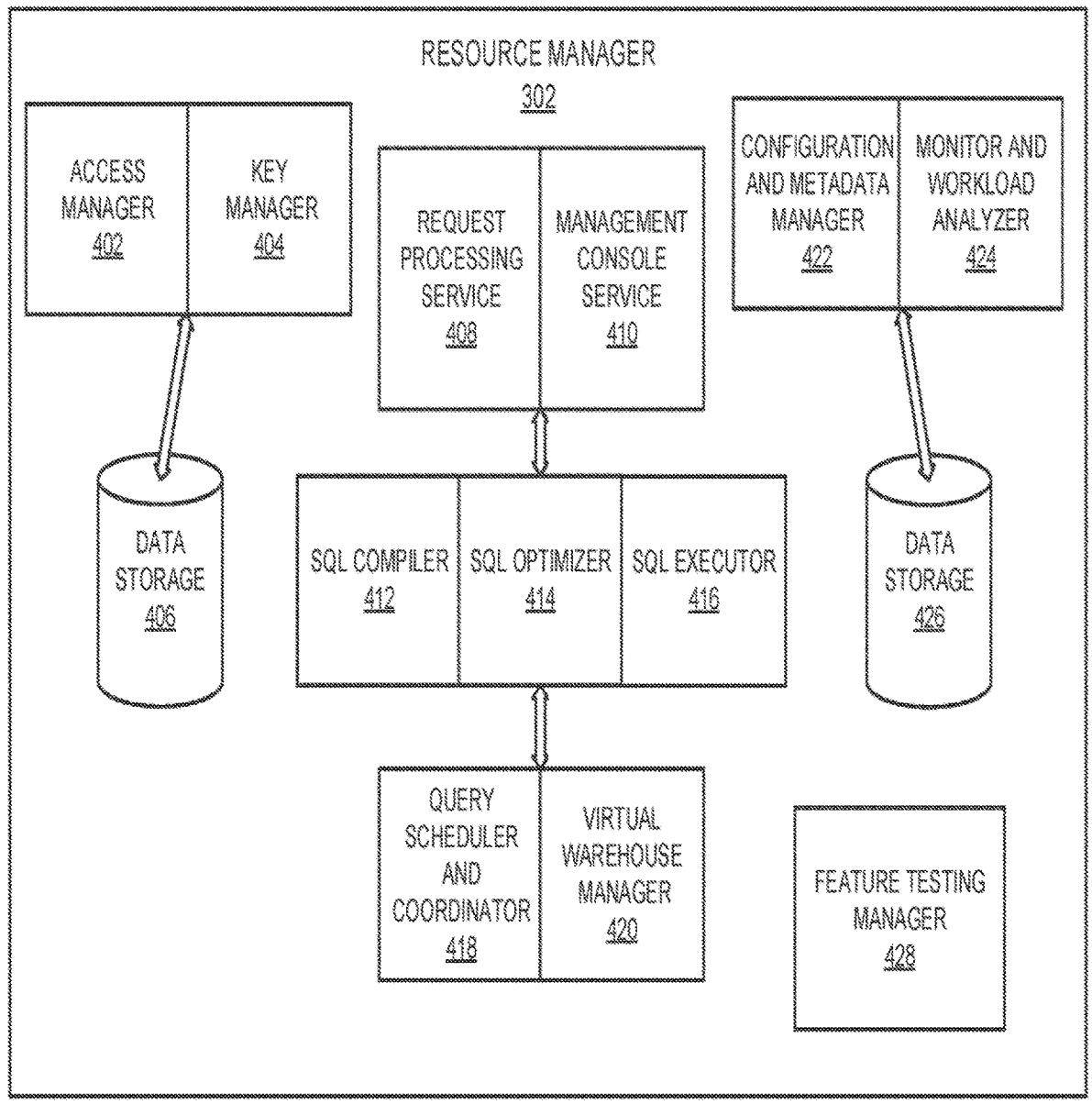
FIG. 4 is a block diagram of an embodiment of a resource manager in accordance with the teachings and principles of the disclosure.

FIG. 4 is a block diagram depicting an embodiment of resource manager 302. As shown in FIG. 3, resource manager 302 includes an access manager 402 and a key manager 404 coupled to a data storage device 406. Access manager 402 may handle authentication and authorization tasks for the systems described herein. Key manager 404 may manage storage and authentication of keys used during authentication and authorization tasks. A request processing service 408 manages received data storage requests and data retrieval requests. A management console service 410 supports access to various systems and processes by administrators and other system managers.

Resource manager 302 may also include an SQL compiler 412, an SQL optimizer 414 and an SQL executor 210. SQL compiler 412 parses SQL queries and generates the execution code for the queries. SQL optimizer 414 determines the best method to execute queries based on the data that needs to be processed. SQL executor 416 executes the query code for queries received by resource manager 302. A query scheduler and coordinator 418 may send received queries to the appropriate services or systems for compilation, optimization, and dispatch to the execution platform 312. A virtual warehouse manager 420 manages the operation of multiple virtual warehouses implemented in an execution platform.

Additionally, resource manager 302 includes a configuration and metadata manager 422, which manages the information related to the data stored in the remote data storage devices and in the local caches. A monitor and workload analyzer 424 oversees the processes performed by resource manager 302 and manages the distribution of tasks (e.g., workload) across the virtual warehouses and execution nodes in the execution platform. Configuration and metadata manager 422 and monitor and workload analyzer 424 are coupled to a data storage device 426.

Resource manager 302 also includes a feature testing manager 428, which manages feature and/or program testing against historical client queries. The feature testing manager 428 may be configured to determine a workload and/or parameters for a baseline run or target run of historical client queries. The feature testing manager 428 may perform verification steps to ensure the reliability of testing data and may further generate a report indicating how the feature and/or program performed when implemented with actual historical client queries.

Figure 5:
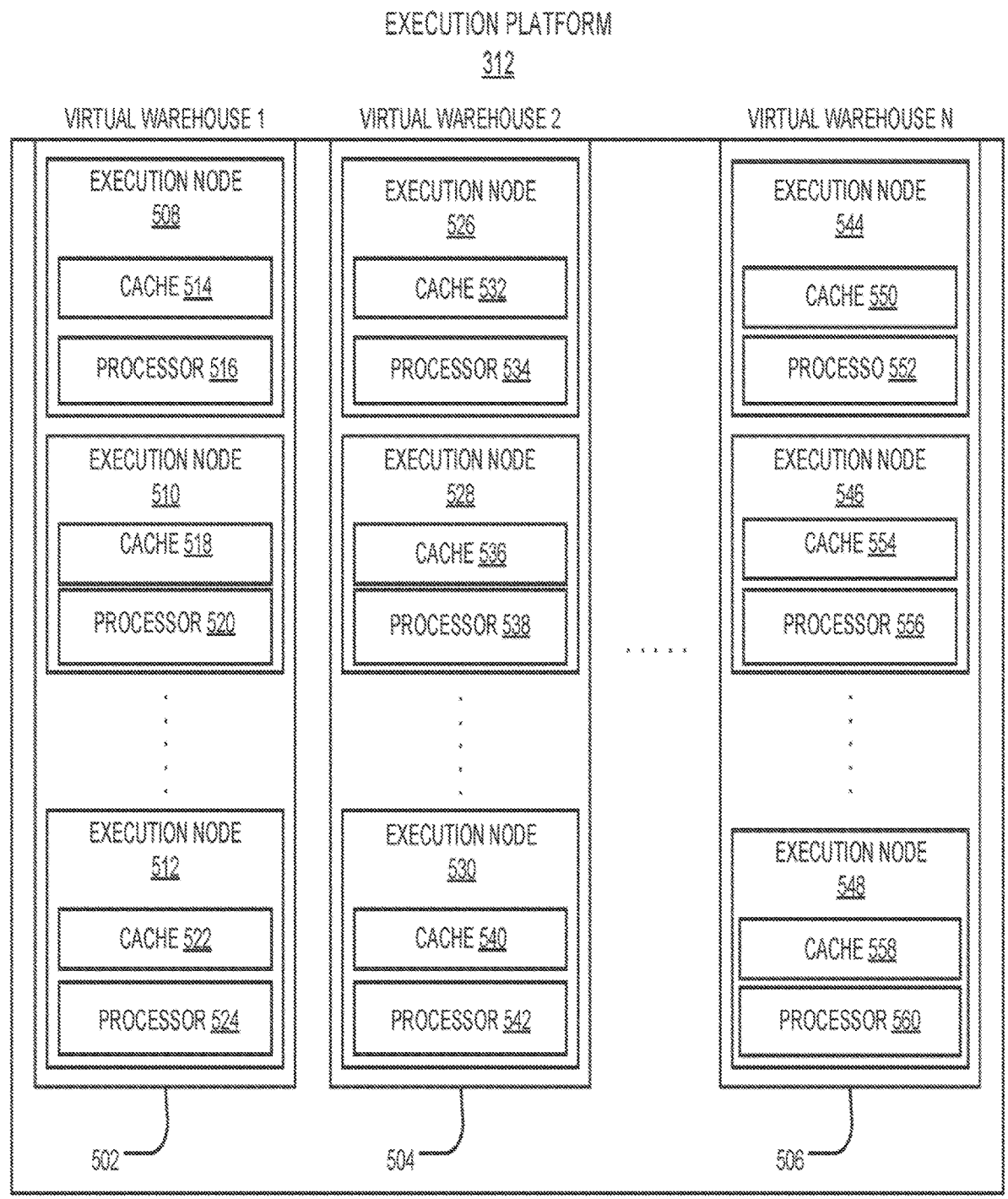
FIG. 5 is a block diagram of an execution platform in accordance with the teachings and principles of the disclosure.

FIG. 5 is a block diagram depicting an embodiment of an execution platform 312. Execution of baseline runs and/or target runs (and any other additional runs as deemed necessary) may be executed on the execution platform 312. In an embodiment, feature testing runs are exclusively run on dedicated virtual warehouses that are used only for feature testing and are not used for production queries issued by database clients. The use of dedicated virtual warehouses for feature testing may ensure that a client's performance and runtime are not impacted by feature development processes.

As shown in FIG. 5, execution platform 312 includes multiple virtual warehouses 502, 504, and 506. Each virtual warehouse includes multiple execution nodes that each includes a cache and a processor. Although each virtual warehouse 502, 504, and 506 shown in FIG. 3 includes three execution nodes, a particular virtual warehouse may include any number of execution nodes without departing from the scope of the disclosure. Further, the number of execution nodes in a virtual warehouse is dynamic, such that new execution nodes are created when additional demand is present, and existing execution nodes are deleted when they are no longer necessary.

Each virtual warehouse 502, 504, and 506 is capable of accessing any of the data storage devices 316, 318, 320 shown in FIG. 3. Thus, virtual warehouses 302, 304, 306 are not necessarily assigned to a specific data storage device 316, 318, 320 and, instead, can access data from any of the data storage devices 316, 318, 320. Similarly, each of the execution nodes shown in FIG. 5 can access data from any of the data storage devices 316, 318, 320. In some embodiments, a particular virtual warehouse or a particular execution node may be temporarily assigned to a specific data storage device, but the virtual warehouse or execution node may later access data from any other data storage device.

In the example of FIG. 5, virtual warehouse 502 includes three execution nodes 508, 510, and 512. Execution node 508 includes a cache 514 and a processor 516. Execution node 510 includes a cache 518 and a processor 520. Execution node 512 includes a cache 522 and a processor 524. Each execution node 508, 510, 512 is associated with processing one or more data storage and/or data retrieval tasks. For example, a particular virtual warehouse may handle data storage and data retrieval tasks associated with a particular user or customer. In other implementations, a particular virtual warehouse may handle data storage and data retrieval tasks associated with a particular data storage system or a particular category of data.

Similar to virtual warehouse 502 discussed above, virtual warehouse 504 includes three execution nodes 526, 528, and 530. Execution node 526 includes a cache 532 and a processor 534. Execution node 528 includes a cache 536 and a processor 538. Execution node 530 includes a cache 540 and a processor 542. Additionally, virtual warehouse 506 includes three execution nodes 544, 546, and 548. Execution node 544 includes a cache 550 and a processor 552. Execution node 546 includes a cache 554 and a processor 556. Execution node 548 includes a cache 558 and a processor 560.

Although the execution nodes shown in FIG. 5 each include one cache and one processor, alternative embodiments may include execution nodes containing any number of processors and any number of caches. Additionally, the caches may vary in size among the different execution nodes. The caches shown in FIG. 5 store, in the local execution node, data that was retrieved from one or more data storage devices in a storage platform 314 (see FIG. 3). Thus, the caches reduce or eliminate potential bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem. In some embodiments, the caches are implemented using high-speed memory devices that provide fast access to the cached data. Each cache can store data from any of the storage devices in storage platform 314.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, a particular execution node may be assigned more processing resources if the tasks performed by the execution node become more processor intensive. Similarly, an execution node may be assigned more cache resources if the tasks performed by the execution node require a larger cache capacity.

Although virtual warehouses 502, 504, 506 are associated with the same execution platform 312 of FIG. 3, the virtual warehouses may be implemented using multiple computing systems at multiple geographic locations. For example, virtual warehouse 502 can be implemented by a computing system at a first geographic location, while virtual warehouses 504 and 506 are implemented by another computing system at a second geographic location. In some embodiments, these different computing systems are cloud-based computing systems maintained by one or more different entities.

Additionally, each virtual warehouse is shown in FIG. 5 as having multiple execution nodes. The multiple execution nodes associated with each virtual warehouse may be implemented using multiple computing systems at multiple geographic locations. For example, a particular instance of virtual warehouse 502 implements execution nodes 508 and 510 on one computing platform at a particular geographic location and implements execution node 512 at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse. Execution platform 312 is also fault tolerant. For example, if one virtual warehouse fails, that virtual warehouse is quickly replaced with a different virtual warehouse at a different geographic location.

A particular execution platform 312 may include any number of virtual warehouses 502, 504, 506. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

Figure 6:
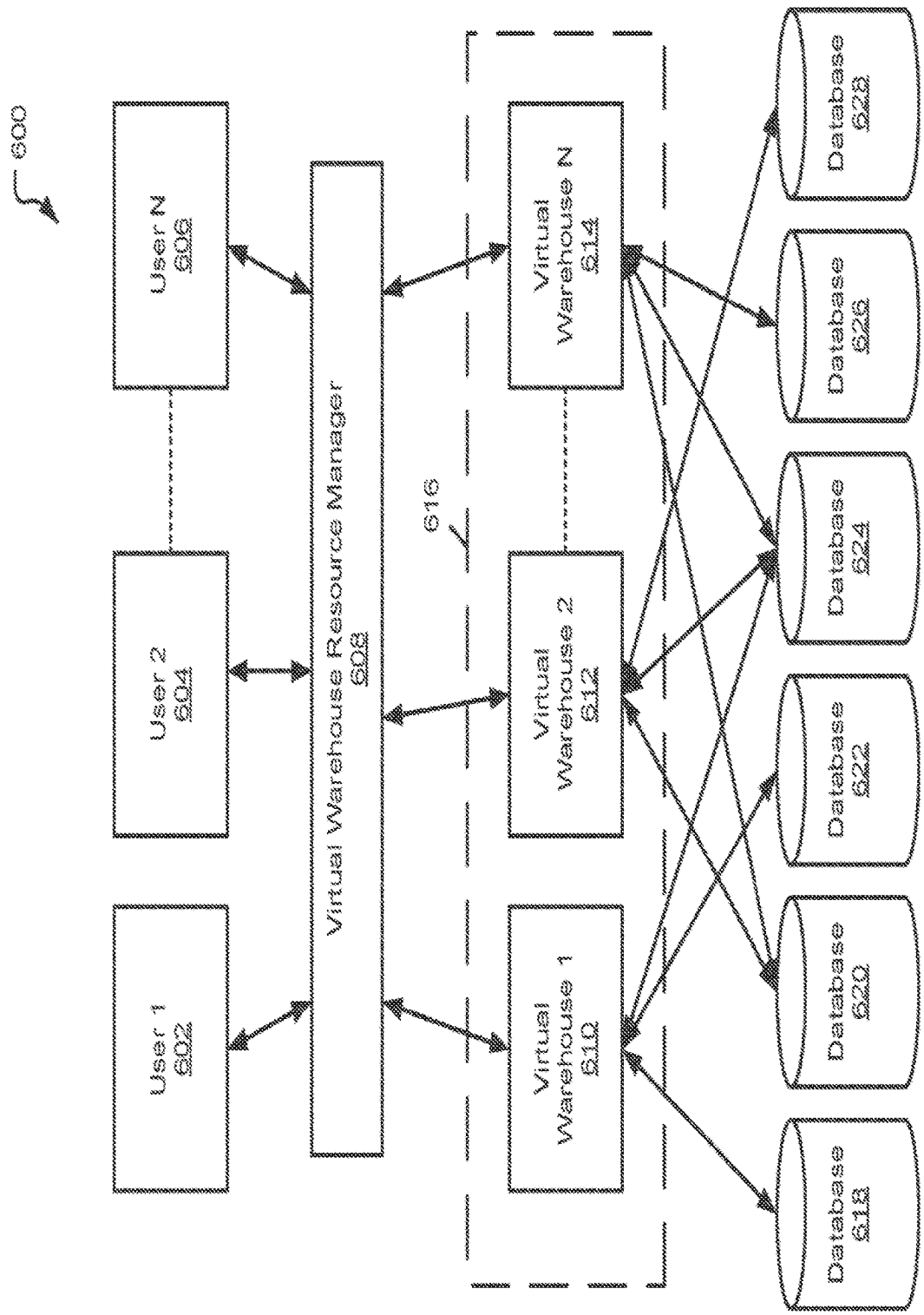
FIG. 6 is a schematic block diagram of an operating environment in accordance with the teachings and principles of the disclosure.

FIG. 6 is a block diagram depicting an embodiment of an operating environment 600 with multiple users accessing multiple databases through a load balancer and multiple virtual warehouses contained in a virtual warehouse group. The operating environment 600 may be applied to production queries executed by users or clients and may further by applied to feature testing where a user (see 602, 604, 606) may refer to a developer 112 that is generating and testing a new feature or program using actual database data.

Environment 600 includes a virtual warehouse resource manager 608 and multiple virtual warehouses 610, 612, and 614 arranged in a virtual warehouse group 616. Virtual warehouse resource manager 608 may be contained in resource manager 302. In particular, multiple users 602, 604, and 606 access multiple databases 618, 620, 622, 624, 626, and 628 through virtual warehouse resource manager 608 and virtual warehouse group 616. In some embodiments, users 602-606 access virtual warehouse resource manager 608 through resource manager 302 (FIG. 1). In some embodiments, virtual warehouse resource manager 608 is implemented within resource manager 302.

Users 602-606 may submit data retrieval and data storage requests to virtual warehouse resource manager 608, which routes the data retrieval and data storage requests to an appropriate virtual warehouse 610-614 in virtual warehouse group 616. In some implementations, virtual warehouse resource manager 608 provides a dynamic assignment of users 602-606 to virtual warehouses 610-614. When submitting a data retrieval or data storage request, users 602-606 may specify virtual warehouse group 616 to process the request without specifying the particular virtual warehouse 610-614 that will process the request. This arrangement allows virtual warehouse resource manager 608 to distribute multiple requests across the virtual warehouses 610-614 based on efficiency, available resources, and the availability of cached data within the virtual warehouses 610-614. When determining how to route data processing requests, virtual warehouse resource manager 608 considers available resources, current resource loads, number of current users, and the like.

In some embodiments, fault tolerance systems create new virtual warehouses in response to a failure of a virtual warehouse. The new virtual warehouse may be in the same virtual warehouse group or may be created in a different virtual warehouse group at a different geographic location.

Each virtual warehouse 610-614 is configured to communicate with a subset of all databases 618-628. For example, in environment 600, virtual warehouse 610 is configured to communicate with databases 618, 620, and 622. Similarly, virtual warehouse 612 is configured to communicate with databases 620, 624, and 626. And, virtual warehouse 614 is configured to communicate with databases 622, 626, and 628. In alternate embodiments, virtual warehouses 610-614 may communicate with any (or all) of the databases 618-628.

Although environment 600 shows one virtual warehouse group 616, alternate embodiments may include any number of virtual warehouse groups, each associated with any number of virtual warehouses. For example, different virtual warehouses may be created for each customer or group of users. Additionally, different virtual warehouses may be created for different entities, or any other group accessing different data sets. Multiple virtual warehouse groups may have different sizes and configurations. The number of virtual warehouse groups in a particular environment is dynamic and may change based on the changing needs of the users and other systems in the environment.

Figure 7:
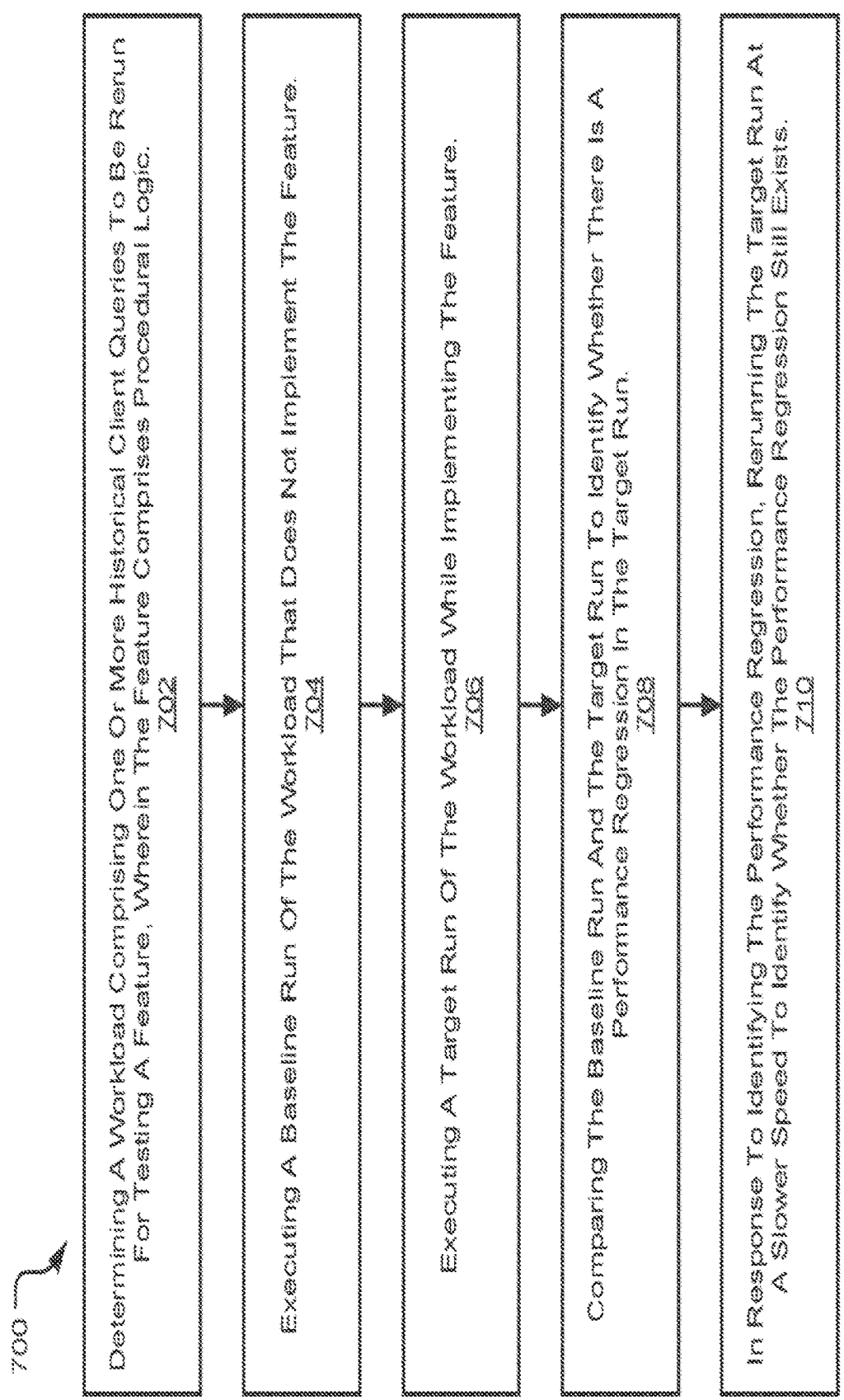
FIG. 7 is a schematic flow chart diagram of a method for testing a feature on a database in accordance with the teachings and principles of the disclosure.

FIG. 7 is a schematic flow chart diagram of a method 700 for testing a feature on a database. The method 700 may be performed by any suitable computing resource such as a resource manager 302 or feature testing manager 428 as disclosed herein.

The method 700 begins and the computing resource determines at 702 a workload comprising one or more historical client queries to be rerun for testing a feature, wherein the feature comprises procedural logic. The computing resource executes at 704 a baseline run of the workload that does not implement the feature. The computing resource executes at 706 a target run of the workload while implementing the feature. The computing resource compares at 708 the baseline run, and the target run to identify whether there is a performance regression in the target run. The computing resource, in response to identifying the performance regression, reruns at 710 the target run to identify whether the performance regression still exists. Rerunning at 710 may include running with more isolated resources and/or running multiple times to protect against variance within a cloud-based database environment, and/or running at a slower speed.

The method 700 may be performed for implementing incremental feature development in a cloud-based database system. Incremental feature development may be enabled by a combination of fast release cycles with an ability to track usage of features combined with an ability to compare results of runs with feature flags on or off. The method 700 may be performed automatically as part of an online upgrade process when implementing new features in a cloud-based database system. In an embodiment, the method 700 may be combined with a method of usage tracking of production workloads. The method of usage tracking of production workloads may be integrated within a testing framework such that workload selection may be determined based on a desired test workload.

In an embodiment, an incremental feature development process is deployed in a cloud-based database system that includes fast online upgrade of new programming logic or features, usage tracking integration within a test framework, and performance verifications that may be combined in a cycle to enable incremental feature development.

FIG. 8 is a block diagram depicting an example computing device 800. In some embodiments, computing device 800 is used to implement one or more of the systems and components discussed herein. For example, computing device 800 may allow a user or administrator to access the resource manager 802. Further, computing device 800 may interact with any of the systems and components described herein. Accordingly, computing device 800 may be used to perform various procedures and tasks, such as those discussed herein. Computing device 800 can function as a server, a client or any other computing entity. Computing device 800 can be any of a wide variety of computing devices, such as a desktop computer, a notebook computer, a server computer, a handheld computer, a tablet, and the like.

Computing device 800 includes one or more processor(s) 802, one or more memory device(s) 804, one or more interface(s) 806, one or more mass storage device(s) 808, and one or more Input/Output (I/O) device(s) 810, all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM)) and/or nonvolatile memory (e.g., read-only memory (ROM)). Memory device(s) 804 may also include rewritable ROM, such as Flash memory.

Mass storage device(s) 808 include various computer readable media, such as magnetic tapes, magnetic disks, optical disks, solid state memory (e.g., Flash memory), and so forth. Various drives may also be included in mass storage device(s) 808 to enable reading from and/or writing to the various computer readable media. Mass storage device(s) 808 include removable media and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, lenses, CCDs or other image capture devices, and the like.

Interface(s) 806 include various interfaces that allow computing device 800 to interact with other systems, devices, or computing environments. Example interface(s) 806 include any number of different network interfaces, such as interfaces to local area networks (LANs), wide area networks (WANs), wireless networks, and the Internet.

Bus 812 allows processor(s) 802, memory device(s) 804, interface(s) 806, mass storage device(s) 808, and I/O device(s) 810 to communicate with one another, as well as other devices or components coupled to bus 812. Bus 812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 800 and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the term "module" is intended convey the implementation apparatus for accomplishing a process, such as by hardware, or a combination of hardware, software, and/or firmware, for the purposes of performing all or parts of query operations.

EXAMPLES

The following examples pertain to further embodiments.

Example 1 is a system for testing a feature on a database. The system includes means for determining a workload comprising one or more historical client queries to be rerun for testing the feature, wherein the feature comprises procedural logic. The system includes means for executing a baseline run of the workload that does not implement the feature. The system includes means for executing a target run of the workload while implementing the feature. The system includes means for comparing the baseline run and the target run to identify whether there is a performance regression in the target run. The system includes, in response to identifying the performance regression, means for rerunning the target run to identify whether the performance regression still exists.

Example 2 is a system as in Example 1, wherein the means for determining the workload is configured to determine based on a workload selection configuration comprising one or more parameters input by a user to filter out unwanted historical client queries, wherein the one or more parameters comprises one or more of: a query sample size; a query initiator such as an account or user that has requested an historical client query; a query schema; a table or micro-partition of a database; a time window for an historical query to have been requested and/or executed; a query text fragment; or a query execution configuration.

Example 3 is a system as in any of Examples 1-2, wherein the means for determining the workload is configured to: deduplicate historical client queries that satisfy the workload selection configuration to determine a grouping of historical client queries; prune the grouping of historical client queries to eliminate queries that consume more than a threshold amount of resources to execute; and select a subset of the pruned grouping of historical client queries to determine a diverse sample, wherein the selecting comprises applying a Query2Vec algorithm to map the pruned grouping of historical client queries to a high dimensional vector space.

Example 4 is a system as in any of Examples 1-3, wherein parameters for the baseline run and parameters for the target run are identical except for a presence of the feature in the target run.

Example 5 is a system as in any of Examples 1-4, further comprising, in response to identifying that the performance regression no longer exists when the target run is rerun with techniques to prune out false positives, means for flagging the performance regression as a false positive.

Example 6 is a system as in any of Examples 1-5, wherein the means for comparing the baseline run and the target run is further configured to identify one or more errors comprising: a wrong result to one or more historical client queries executed in the target run; an internal error in the target run; or a user error in the target run. The system is such that the means for rerunning the target run is further configured to identify whether any of the one or more errors still exists. The system is such that the means for flagging the performance regression as a false positive is further configured to flag any of the one or more errors as a false positive in response to identifying that any of the one or more errors no longer exists when the target run is rerun.

Example 7 is a system as in any of Examples 1-6, further comprising means for generating a report comprising data about the target run, wherein the report does not comprise an indication of any performance regression or error that was flagged as a false positive.

Example 8 is a system as in any of Examples 1-7, further comprising means for obfuscating results of the baseline run and the target run such that a user does not have visibility into any database data associated with the one or more historical client queries of the workload. historical Example 9 is a system as in any of Examples 1-8, wherein the means for executing the baseline run and the means for executing the target run are configured to execute on a dedicated virtual warehouse of a cloud database service that is dedicated for performance of feature testing runs.

Example 10 is a system as in any of Examples 1-9, further comprising means for determining a version of a client's database data that existed when an historical client query of the one or more historical client queries was run by the client, and wherein the means for executing the baseline run and the means for executing the target run are configured to execute on the version of the client's database data that existed when the historical client query of the one or more historical client queries was run by the client.

Example 11 is a method for testing a feature on a database. The method includes determining a workload comprising one or more historical client queries to be rerun for testing the feature, wherein the feature comprises procedural logic. The method includes executing a baseline run of the workload that does not implement the feature. The method includes executing a target run of the workload while implementing the feature. The method includes comparing the baseline run and the target run to identify whether there is a performance regression in the target run. The method includes, in response to identifying the performance regression, rerunning the target run to identify whether the performance regression still exists.

Example 12 is a method as in an Example 11, wherein determining the workload comprises determining based on a workload selection configuration comprising one or more parameters input by a user to filter out unwanted historical client queries, wherein the one or more parameters comprises one or more of: a query sample size; a query initiator such as an account or user that has requested an historical client query; a query schema; a table or micro-partition of a database; a time window for an query to have been requested and/or executed; a query text fragment; or a query execution configuration.

Example 13 is a method as in any of Examples 11-12, wherein determining the workload comprises: deduplicating historical client queries that satisfy the workload selection configuration to determine a grouping of historical client queries; pruning the grouping of historical client queries to eliminate queries that consume more than a threshold amount of resources to execute; and selecting a subset of the pruned grouping of historical client queries to determine a diverse sample, wherein the selecting comprises applying a Query2Vec algorithm to map the pruned grouping of historical client queries to a high dimensional vector space.

Example 14 is a method as in any of Examples 11-13, wherein parameters for the baseline run and parameters for the target run are identical except for a presence of the feature in the target run.

Example 15 is a method as in any of Examples 11-14, further comprising, in response to identifying that the performance regression no longer exists when the target run is rerun with techniques to prune out false positives, flagging the performance regression as a false positive.

Example 16 is a processor that is programmable to execute instructions stored in non-transitory computer readable storage media, the instructions comprising: determining a workload comprising one or more historical client queries to be rerun for testing the feature, wherein the feature comprises procedural logic; executing a baseline run of the workload that does not implement the feature; executing a target run of the workload while implementing the feature; comparing the baseline run and the target run to identify whether there is a performance regression in the target run; and in response to identifying the performance regression, rerunning the target run with techniques to prune out false positives to identify whether the performance regression still exists.

Example 17 is a processor as in Example 16, wherein determining the workload comprises determining based on a workload selection configuration comprising one or more parameters input by a user to filter out unwanted historical client queries, wherein the one or more parameters comprises one or more of: a query sample size; a query initiator such as an account or user that has requested an historical client query; a query schema; a table or micro-partition of a database; a time window for an historical query to have been requested and/or executed; a query text fragment; or a query execution configuration.

Example 18 is a processor as in any of Examples 16-17, wherein determining the workload comprises: deduplicating historical client queries that satisfy the workload selection configuration to determine a grouping of historical client queries; pruning the grouping of historical client queries to eliminate queries that consume more than a threshold amount of resources to execute; and selecting a subset of the pruned grouping of historical client queries to determine a diverse sample, wherein the selecting comprises applying a Query2Vec algorithm to map the pruned grouping of historical client queries to a high dimensional vector space.

Example 19 is a processor as in any of Examples 16-18, wherein the instructions further comprise, in response to identifying that the performance regression no longer exists when the target run is rerun, flagging the performance regression as a false positive.

Example 20 is a processor as in any of Examples 16-19, wherein comparing the baseline run and the target run further comprises identifying one or more errors comprising: a wrong result to one or more historical client queries executed in the target run; an internal error in the target run; or a user error in the target run. The instructions are such that the instructions further comprise identifying whether any of the one or more errors still exists when the target run is rerun. The instructions are such that the instructions further comprise flagging any of the one or more errors as a false positive in response to identifying that any of the one or more errors no longer exists when the target run is rerun.

What is claimed is:

1. A system for testing a feature on a database, the system comprising:
    a processor to:
        compare a baseline run of a workload and a target run of the workload to identify whether there is a performance regression in the target run, wherein the target run implements a feature that is not implemented in the baseline run;
        in response to identifying the performance regression, identify a query of the baseline run and the target run that executes at a slower execution rate when using the target run as compared to when using the baseline run;
        re-execute the query using the target run on separate isolated resources to identify whether the performance regression still exists; and
        flag the performance regression as a false positive in response to identifying that the performance regression no longer exists when the query is re-executed using the target run on the separate isolated resources.

2. The system of claim 1, wherein the comparison of the baseline run and the target run is based on a previous execution of the baseline run and the target run by the processor.

3. The system of claim 1, wherein the feature comprises procedural logic.

4. The system of claim 1, wherein the baseline run and the target run are compared based on a workload selection configuration comprising one or more parameters input by a user to filter out unwanted historical client queries.

5. The system of claim 4, the processor to:
    deduplicate historical client queries that satisfy the workload selection configuration to determine a grouping of historical client queries;
    prune the grouping of historical client queries to eliminate queries that consume more than a threshold amount of resources to execute; and
    select a subset of the pruned grouping of historical client queries to determine a diverse sample by applying an algorithm to map the pruned grouping of historical client queries to a high dimensional vector space.

6. The system of claim 1, wherein the feature modifies a function of the database.

7. The system of claim 1, wherein parameters for the baseline run and parameters for the target run are identical except for a presence of the feature in the target run.

8. The system of claim 1, wherein the separate isolated resources use lower concurrency to re-execute the query using target run.

9. The system of claim 1, wherein the processor to identify one or more errors in response to comparing the baseline run and the target run, the one or more errors comprising:
    a wrong result to one or more historical client queries executed in the target run;
    an internal error in the target run; or
    a user error in the target run; and
    wherein to execute the target run, the processor is further to identify whether any of the one or more errors still exists; and
    wherein to flag the performance regression as a false positive, the processor is further to flag any of the one or more errors as a false positive in response to identifying that any of the one or more errors no longer exists when the target run is rerun.

10. The system of claim 9, wherein the processor is further to generate a report comprising data about the target run, wherein the report does not comprise an indication of any performance regression or error that was flagged as a false positive.

11. The system of claim 1, wherein the processor is further to obfuscate results of the baseline run and the target run such that a user does not have visibility into any database data associated with the workload.

12. The system of claim 1, wherein the processor to execute the target run on a dedicated virtual warehouse of a cloud database service that is dedicated for performance of feature testing runs.

13. The system of claim 1, wherein the processor further to determine a version of a client's database data that existed when a historical client query was run by the client, and wherein the processor to execute on the version of the client's database data that existed when the historical client query of the one or more historical client queries was run by the client.

14. A method of testing a feature on a database, the method comprising:
    comparing a baseline run of a workload and a target run of the workload to identify whether there is a performance regression in the target run, wherein the target run implements a feature that is not implemented in the baseline run;
    in response to identifying the performance regression, identify a query of the baseline run and the target run that executes at a slower execution rate when using the target run as compared to when using the baseline run;

re-executing the query using the target run on separate isolated resources to identify whether the performance regression still exists; and flagging, by a processor, the performance regression as a false positive in response to identifying that the performance regression no longer exists when the query is re-executed using the target run on the separate isolated resources.

15. The method of claim 14, wherein the comparison of the baseline run and the target run is based on a previous execution of the baseline run and the target run by the processor.

16. The method of claim 14, wherein the feature comprises procedural logic.

17. The method of claim 14, wherein the baseline run and the target run are compared based on a workload selection configuration comprising one or more parameters input by a user to filter out unwanted historical client queries.

18. The method of claim 17, further comprising:
deduplicating historical client queries that satisfy the workload selection configuration to determine a grouping of historical client queries;
pruning the grouping of historical client queries to eliminate queries that consume more than a threshold amount of resources to execute; and
selecting a subset of the pruned grouping of historical client queries to determine a diverse sample by applying an algorithm to map the pruned grouping of historical client queries to a high dimensional vector space.

19. The method of claim 14, wherein the feature modifies a function of the database.

20. The method of claim 14, wherein parameters for the baseline run and parameters for the target run are identical except for a presence of the feature in the target run.

21. The method of claim 14, wherein the separate isolated resources use lower concurrency to re-execute the query using target run.

22. The method of claim 14, further comprising identifying one or more errors in response to comparing the baseline run and the target run, the one or more errors comprising:
a wrong result to one or more historical client queries executed in the target run;
an internal error in the target run; or
a user error in the target run; and
wherein to execute the target run, the processor is further to identify whether any of the one or more errors still exists; and
wherein to flag the performance regression as a false positive, the processor is further to flag any of the one or more errors as a false positive in response to identifying that any of the one or more errors no longer exists when the target run is rerun.

23. The method of claim 22, further comprising:
generating a report comprising data about the target run, wherein the report does not comprise an indication of any performance regression or error that was flagged as a false positive.

24. The method of claim 14, further comprising:
executing the target run on a dedicated virtual warehouse of a cloud database service that is dedicated for performance of feature testing runs.

25. A non-transitory computer readable storage media, programmable to execute instructions that, when executed, cause a processor to:
compare a baseline run of a workload and a target run of the workload to identify whether there is a performance regression in the target run, wherein the target run implements a feature that is not implemented in the baseline run;
in response to identifying the performance regression, identify a query of the baseline run and the target run that executes at a slower execution rate when using the target run as compared to when using the baseline run;
re-execute the query using the target run on separate isolated resources to identify whether the performance regression still exists; and
flag, by the processor, the performance regression as a false positive in response to identifying that the performance regression no longer exists when the query is re-executed using the target run on the separate isolated resources.

26. The non-transitory computer readable storage media of claim 25, wherein the comparison of the baseline run and the target run is based on a previous execution of the baseline run and the target run by the processor.

27. The non-transitory computer readable storage media of claim 25, wherein the feature comprises procedural logic.

28. The non-transitory computer readable storage media of claim 25, wherein the baseline run and the target run are compared based on a workload selection configuration comprising one or more parameters input by a user to filter out unwanted historical client queries.

29. The non-transitory computer readable storage media of claim 28, the processor to:
deduplicate historical client queries that satisfy the workload selection configuration to determine a grouping of historical client queries;
prune the grouping of historical client queries to eliminate queries that consume more than a threshold amount of resources to execute; and
select a subset of the pruned grouping of historical client queries to determine a diverse sample by applying an algorithm to map the pruned grouping of historical client queries to a high dimensional vector space.

30. The non-transitory computer readable storage media of claim 25, the processor to:
execute the target run on a dedicated virtual warehouse of a cloud database service that is dedicated for performance of feature testing runs.

* * * * *

UNITED STATES PATENT AND TRADEMARK OFFICE
CERTIFICATE OF CORRECTION

| | |
|---|---|
| PATENT NO. | : 11,138,167 B2 |
| APPLICATION NO. | : 16/943274 |
| DATED | : October 5, 2021 |
| INVENTOR(S) | : Allison Lee et al. |

It is certified that error appears in the above-identified patent and that said Letters Patent is hereby corrected as shown below:

In the Specification

In Column 21, Line 59, please replace "workload. historical" with -- workload. --

Signed and Sealed this
Eighth Day of October, 2024

Katherine Kelly Vidal
*Director of the United States Patent and Trademark Office*